C. S. MOORE.
VEHICLE SIGNAL DEVICE.
APPLICATION FILED JAN. 30, 1911.
992,795.
Patented May 23, 1911.
2 SHEETS—SHEET 2.
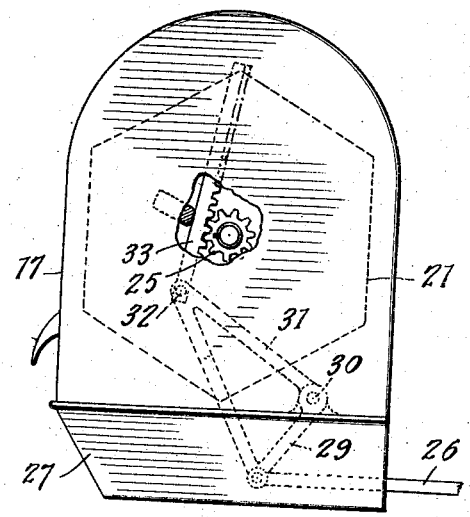
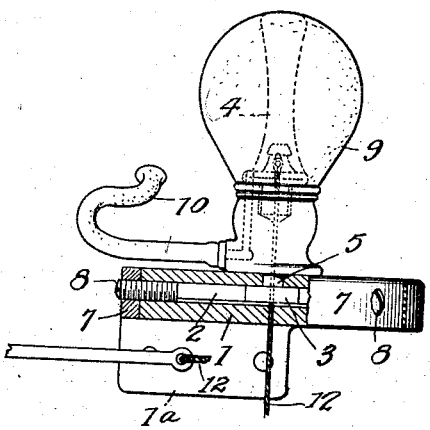
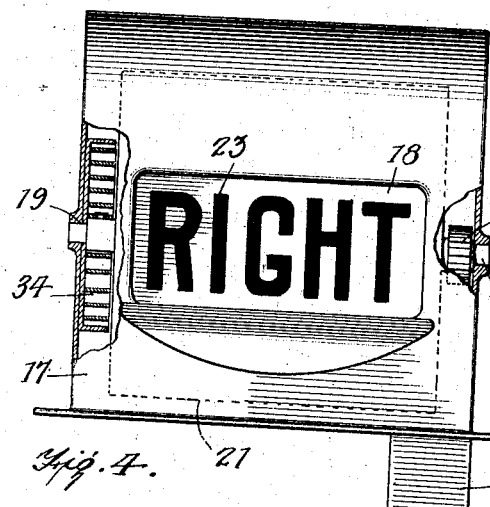
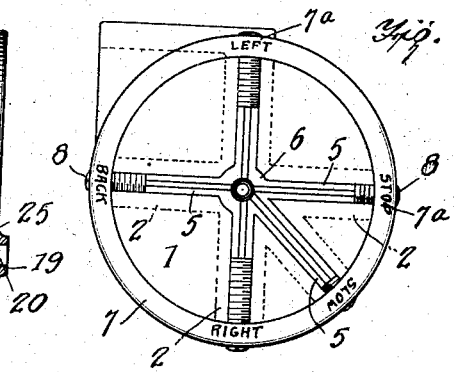
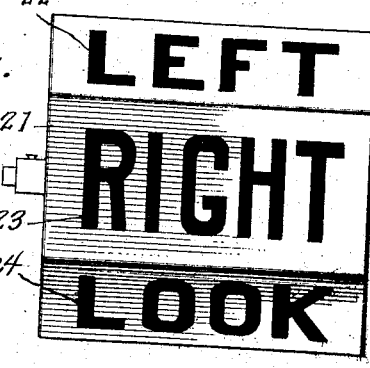
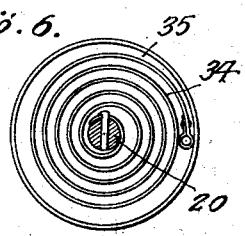
Inventor
CHARLES S. MOORE
Witnesses

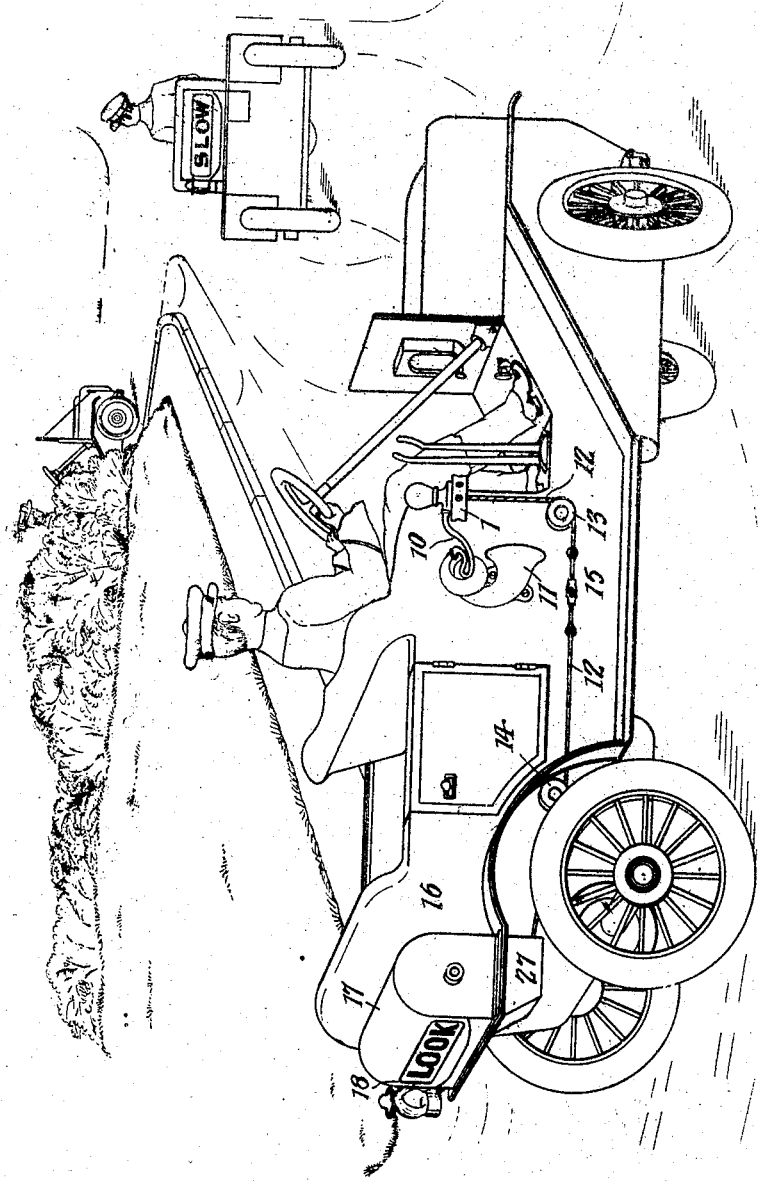

UNITED STATES PATENT OFFICE.

CHARLES S. MOORE, OF DANVERS, MASSACHUSETTS.

VEHICLE SIGNAL DEVICE.

992,795.  Specification of Letters Patent.  Patented May 23, 1911.

Application filed January 30, 1911. Serial No. 605,406.

*To all whom it may concern:*

Be it known that I, CHARLES S. MOORE, a citizen of the United States, residing at Danvers, in the county of Essex and Commonwealth of Massachusetts, have invented a new and useful Vehicle Signal Device for the Prevention of Rear-End Vehicle Collisions, and More Particularly for Use on Automobiles, of which the following is a full, clear, and exact description, such as will enable others versed in the art to which it appertains to make and use my said appliance.

My invention relates to signal devices intended to be used and displayed on the rear end of vehicles and to the method and manner of operating and controlling the same.

The objects of my invention are first, to provide a means for indicating at the rear of the vehicle just what the driver's intentions are for future control, whether they be to slow up, stop, back, or go to the right or left; second, to provide a means for the control of said signaling device, and to provide other advantages and results, some of which may be hereinafter referred to in connection with the description of the various parts.

In the accompanying drawings; Figure 1 is a perspective view of an automobile equipped with my improvements; Fig. 2 is a view, in side elevation, partly in section, of my invention; Fig. 3 is a detached, detail view, in top plan, of the plate 1 and associated mechanism; Fig. 4 is a detached, detail view, in front elevation, of the visual-signal casing; Fig. 5 is a detached, detail view, in front elevation, of the drum, removed from said casing; and Fig. 6 is a detached, detail view of the spring.

Referring, now, in detail to the drawings: Supported in any desired manner, as by a bracket 1ª, secured to the automobile 16, is an annular plate or casting 1, having a plurality of radial grooves 2 therein, in which is reciprocable a stud 3 carried by the inner end of an operating-handle, crank, or lever 4. Radial slots 5, of less cross sectional area than the grooves 2, are cut in the upper face of said plate 1, and communicate with said grooves 2. The radial center or hub portion 6 of said slots 5 may be circular in cross section and of greater cross sectional area than any one of said slots 5, but is, of course, of lesser cross-sectional area than the stud 3, so that the stud may not be accidentally displaced or removed from the grooves 2. An annulus or ring-member 7 may be secured circumferentially around said plate 1, and bears on its upper face sign-words 7ª (such as "Stop," "Slow," etc.) over each slot 5, so as to identify each slot. Plugs, which may be screws 8, of differing lengths, may be screwed radially through the annulus 7, their inner portions projecting into said grooves 2, these screws thus constituting adjustable stops, limiting the outward movement of said stud 3 in its travel along the grooves 2.

Conveniently and advantageously, the handle 4 may be operatively associated with a horn 11, and desirably the manner of association is to have the handle 4 carried within the bulb 9, which has an outlet through the tube 10 connecting with said horn; so that, simultaneously with the operation of the bulb and the consequent sounding of an audible alarm through the horn 11, a visual signal or alarm may be displayed at the rear of the automobile, in the manner and by the mechanism now about to be fully described. A flexible member, such as a cord 12, is secured to the stud 3, and may be guided and directed in its movements by pulleys 13, 14 carried by the side 15 of the automobile 16, and over which pulleys said rope passes.

The visual-signal apparatus and its preferable form of connections with the cord 12 will now be described: At the rear of the automobile is supported a casing or box 17 provided with an orifice or slot 18, through which a visual signal may be displayed. Supported in bearings 19, 19 in said casing 17 is an axial shaft 20 of a polygonal-faced drum 21 interiorly of the casing 17. On each of said polygonal faces of the drum may be printed a visual signal 22, 23, 24, such as the words "Left," "Right," "Look," respectively; it being understood of course that the number of signals is only limited by the number of polygonal faces of the drum.

Any suitable mechanism may be employed for operating the visual-signal drum. That preferred and, therefore, shown herein as an illustration, is as follows: A pinion 25 is secured on one end of the shaft 20. The rear end of the cord 12 (*i. e.*, the end thereof opposite its connection with the stud 3) is secured to one end of a horizontal rod or rock-shaft 26. The other end of said rock-shaft is pivoted to the end of the shorter arm 29 of a bell-crank lever, fulcrumed, as at 30, to the casing 17, the end of the longer arm 31 of the lever being pivoted, as at 32, to a rack 33, meshing with the pinion 25. A coil-spring 34, having one end thereof secured to the shaft 20 of the drum 21, and the other end thereof to a spring-casing 35 carried at one end of the drum 21, maintains the drum 21 in normal position, *i. e.*, with the signal "Look" in line with the slot 18, and with the stud 3 at the center 6.

The operation of the device is as follows: It will be noted that the length of movement of the rack 33 is proportioned to the length of throw of the stud 3 from the center 6 to the particular stop 8, and it will be seen, by reference to Fig. 2, that the length of throw of the stop is different with different slots. Thus, when the stud 3 is moved by the handle 4 along the slot 2 marked "Stop", until arrested by the stop 8, the drum will have been rotated sufficiently to bring the word "Sto]" thereon in line with the opening 18. When the stud 3 is moved along any one of the slots 2, cord 12 attached to said stud will be pulled and the horizontal rock-shaft 26 (to which said cord is connected) will be moved or drawn forward, thus rocking the bell-crank lever 29—31 on its fulcrum 30, and reciprocating the rack 33 in mesh with the pinion 25, so as to rotate the drum 21.

It will be noted that the sounding of the audible alarm 11 by the compression of the bulb 9 may be effected practically simultaneously with the actuation of the visual-signal or alarm in the casing 17, at the rear of the automobile. This simultaneous sounding of the audible alarm and the display of the visual signal, by the one and the same hand of the operator, is very advantageous.

Having thus fully described my invention, what I claim as new and desire to secure by Letters-Patent is:

1. In a visual-signal device, a rotating body having visual signals thereon, a member having radial grooves therein, a manually-operable member carrying, at one end, a member slidable in said grooves, adjustable stops disposed in said grooves for limiting the outward movement of said slidable member; and mechanism intermediate said slidable member and said rotating body for revolving the latter upon movement of the former.

2. In a visual-signal device, a rotating body having visual signals thereon, a member having radial grooves therein, a manually-operable member carrying, at one end, a stud slidable in said grooves, adjustable stops disposed in said grooves for limiting the outward movement of said stud, and mechanism intermediate said stud and said rotating body for revolving the latter upon movement of the former.

3. In a visual-signal device, a rotating body having visual signals thereon, a member having radial grooves therein, a manually-operable member carrying, at one end, a member slidable in said grooves, adjustable stops, comprising screws, disposed in said grooves for limiting the outward movement of said slidable member, and mechanism intermediate said slidable member and said rotating body for revolving the latter upon movement of the former.

4. In a visual-signal device, a rotating body having visual signals thereon, a member having radial grooves therein, a manually-operable member carrying, at one end, a member slidable in said grooves, adjustable stops disposed in said grooves for limiting the outward movement of said slidable member, a pinion carried by said rotating body, a toothed member meshing with said pinion, and operative mechanism intermediate said toothed member and said slidable member for actuating the former upon movement of the latter.

5. In a visual-signal device, a rotating body having visual signals thereon, a member having radial grooves therein, a manually-operable member carrying, at one end, a member slidable in said grooves, adjustable stops disposed in said grooves for limiting the outward movement of said slidable member, a pinion carried by said rotating body, a rack meshing with said pinion, and operative mechanism intermediate said rack and said slidable member for actuating the former upon movement of the latter.

6. In a visual-signal device, a rotating body having visual signals thereon, a member having radial grooves therein, a manually-operable member carrying, at one end, a member slidable in said grooves, adjustable stops disposed in said grooves for limiting the outward movement of said slidable member, a pinion carried by said rotating body, a rack meshing with said pinion, a bell-crank lever pivoted to said rack, and operative mechanism intermediate said bell-crank lever and said slidable member for actuating the former upon movement of the latter.

7. In a visual-signal device, a rotating body having visual signals thereon, a member having radial grooves therein, a manually-operable member carrying, at one end, a member slidable in said grooves, adjustable stops disposed in said grooves for limiting the outward movement of said slidable member, mechanism intermediate said slidable member and said rotating body for revolving the latter upon movement of the former, and means for automatically returning the several parts to normal position after actuation thereof.

8. In a visual-signal device, a rotating body having visual signals thereon, a member having radial grooves therein, a manually-operable member carrying, at one end, a member slidable in said grooves, adjustable stops disposed in said grooves for limiting the outward movement of said slidable member, mechanism intermediate said slidable member and said rotating body for revolving the latter upon movement of the former, and spring means for automatically returning the several parts to normal position after actuation thereof.

9. In a visual-signal device, a rotating body having visual signals thereon, a member having radial grooves therein, a manually-operable member carrying, at one end, a member slidable in said grooves, adjustable stops disposed in said grooves for limiting the outward movement of said slidable member, mechanism intermediate said slidable member and said rotating body for revolving the latter upon movement of the former, and an audible alarm associated with said visual-signal device and operable simultaneously upon actuation thereof.

10. In a visual-signal device, a rotating body having visual signals thereon, a member having radial grooves therein, a manually-operable member carrying, at one end, a member slidable in said grooves, adjustable stops disposed in said grooves for limiting the outward movement of said slidable member, mechanism intermediate said slidable member and said rotating body for revolving the latter upon movement of the former, and an audible alarm associated with said visual-signal device and operable simultaneously upon actuation thereof, and including a manually-operable member encircling said visual-signal manually-operable member.

In testimony whereof I hereunto set my signature in the presence of two attesting witnesses.

CHARLES S. MOORE. [L. S.]

Witnesses:
JULIUS PEAKE,
MAUDE M. MOORE.

---

Copies of this patent may be obtained for five cents each, by addressing the "Commissioner of Patents, Washington, D. C."